US011030452B2

(12) United States Patent
Ernst et al.

(10) Patent No.: US 11,030,452 B2
(45) Date of Patent: Jun. 8, 2021

(54) PATTERN DETECTION

(71) Applicant: Fraunhofer-Gesellschaft zur Foerderung der angewandten Forschung e.V., Munich (DE)

(72) Inventors: Andreas Ernst, Erlangen (DE); Mathis Hoffmann, Erlangen (DE); Jens-Uwe Garbas, Erlangen (DE); Tobias Bergen, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 7 days.

(21) Appl. No.: 16/296,090

(22) Filed: Mar. 7, 2019

(65) Prior Publication Data
US 2019/0205641 A1 Jul. 4, 2019

Related U.S. Application Data

(63) Continuation of application No. PCT/EP2016/071724, filed on Sep. 14, 2016.

(51) Int. Cl.
*G06K 9/00* (2006.01)
*G06T 7/80* (2017.01)
(Continued)

(52) U.S. Cl.
CPC ............ *G06K 9/00503* (2013.01); *G06T 7/13* (2017.01); *G06T 7/155* (2017.01); *G06T 7/80* (2017.01);
(Continued)

(58) Field of Classification Search
CPC .......................................... G06T 2207/20036
See application file for complete search history.

(56) References Cited

U.S. PATENT DOCUMENTS 9,503,703 B1\* 11/2016 Ramaswamy ....... H04N 13/246
2008/0101693 A1\* 5/2008 Young .................. G06K 9/3208
382/165
(Continued)

FOREIGN PATENT DOCUMENTS

JP 2014002718 A 1/2014
WO 2012113732 A1 8/2012
(Continued)

OTHER PUBLICATIONS

Barreto, Joao et al., "Automatic camera calibration applied to medical endoscopy", In BMVC 2009—20th British Machine Vision Conference, London, United Kingdom, 2009. The British Machine Vision Association (BMVA), 2009, pp. 1-10.
(Continued)

*Primary Examiner* — Oneal R Mistry
(74) *Attorney, Agent, or Firm* — Perkins Coie LLP; Michael A. Glenn

(57) ABSTRACT

A method for detecting a known pattern having homogeneous areas includes the steps of taking an image of the known pattern or, of at least a portion of the known pattern, and performing detection. Detection includes an initial detection of a first region of the image and the detection of a feature of the known pattern within a second region of the image. The second region is arranged adjacent to the first region. The initial detection is aimed at estimating at least one region parameter, such as a position of the region of the pattern, and/or orientation of the region or distortion of same. Starting from this, the second region can be selected in which a feature, such as a corner of the checkerboard is detectable. This second detection step is aimed at obtaining at least one region parameter such as the position of a feature within the second region.

26 Claims, 8 Drawing Sheets

(51) Int. Cl.
    G06T 7/00        (2017.01)
    G06T 7/13        (2017.01)
    G06T 7/155       (2017.01)
(52) U.S. Cl.
    CPC ...... *G06T 7/97* (2017.01); *G06T 2207/20036* (2013.01)

(56) References Cited

U.S. PATENT DOCUMENTS

| | | | | |
|---|---|---|---|---|
| 2012/0133780 | A1* | 5/2012 | Zhang | H04N 17/002 348/187 |
| 2014/0078260 | A1* | 3/2014 | Taubin | G06T 7/80 348/46 |
| 2015/0131911 | A1 | 5/2015 | Uchiyama et al. | |
| 2017/0236024 | A1* | 8/2017 | Wang | G06K 9/4652 382/201 |
| 2018/0200112 | A1* | 7/2018 | Krampert | A61F 9/0084 |

FOREIGN PATENT DOCUMENTS

| | | |
|---|---|---|
| WO | 2013015699 A1 | 1/2013 |
| WO | 2014054958 A2 | 4/2014 |

OTHER PUBLICATIONS

Brown, Duane C., "Close-Range Camera Calibration", Photogrammetric Engineering, 37, 1971, pp. 855-866.

Cootes, T. F. et al., "Active Shape Models—'Smart Snakes'", Proceedings of the British Machine Vision Conference, BMVA Press, 1992. doi: 10.5244/C.6.28, 1992, pp. 28.1-28.10.

Duda, R. O. et al., "Pattern classification and scene analysis", Wiley, New York, USA, 2nd edition, 2001.

Ernst, Andreas et al., "Check My Chart: A Robust Color Chart Tracker for Colorimetric Camera Calibration", In Proceedings of the 6th International Conference on Computer Vision / Computer Graphics Collaboration 8 Techniques and Applications, MIRAGE '13, pp. 5:1-5:8, New York, NY, USA, 2013. ACM., 2013, pp. 5:1-5:8.

Fiala, Mark et al., "Fully automatic camera calibration using self-identifying calibration targets", National Research Council Canada, Institute for Information Technology, Published as NRC/ERB-1130. Nov. 2005. 26 Pages. NRC 48306, Nov. 2005.

Fuersattel, Peter et al., "OCPAD—Occluded Checkerboard Pattern Detector", Applications of Computer Vision (WACV), 2016 IEEE Winter Conference, Mar. 2016.

Geiger, Andreas et al., "Automatic camera and range sensor calibration using a single shot", 2012 IEEE International Conference on Robotics and Automation, May 1, 2012, pp. 3936-3943, May 1, 2012, pp. 3936-3943.

Heikkila, Janne et al., "A Four-step Camera Calibration Procedure with Implicit Image Correction", Oulu, Finland, 1997.

Li, Wenjing et al., "Robust distortion correction of endoscope", Proceedings of SPIE—The International Society for Optical Engineering, Mar. 2008.

Mallon, John et al., "Which pattern? Biasing aspects of planar calibration patterns and detection methods", Pattern recognition letters, 28(8):921-930, 2007.

Malti, Abed et al., "Hand-eye and radial distortion calibration for rigid endoscopes", The International Journal of Medical Robotics and Computer Assisted Surgery, 9(4):441-454, 2013, pp. 441-454.

Melo, Rui et al., "A New Solution for Camera Calibration and Real-Time Image Distortion Correction in Medical Endoscopy—Initial Technical Evaluation", IEEE Transactions on Biomedical Engineering, 59(3), Mar. 2012, pp. 634-644.

Rufli, Martin et al., "Automatic Detection of Checkerboards on Blurred and Distorted Images", Autonomous Systems Lab, ETH Zurich, Switzerland, 2008.

Scholz, Volker et al., "Garment Motion Capture Using Color-Coded Patterns", Computer Graphics Forum, vol. 24, No. 3, Sep. 7, 2005, pp. 439-447.

Stehle, Thomas et al., "Camera Calibration for Fish-Eye Lenses in Endoscopy with an Application to 3D Reconstruction", Institute of Imaging and Computer Vision, Apr. 18, 2007.

Sun, Weibin et al., "Robust Recognition of Checkerboard Pattern for Deformable Surface Matching in Multiple Views", DALAB School of Software, China, Proceedings of the 2008 High Performance, 2008.

Tsai, Roger Y, "A Versatile Camera Calibration Technique for High-accuracy 3D Machine Vision Metrology Using Off-the-shelf TV Cameras and LensesA Versatile Camera Calibration Technique for High-accuracy 3D Machine Vision Metrology Using Off-the-shelf TV Cameras and Lenses", In L. Wolff, S. Shafer, and G. Healey, editors, IEEE Journal of Robotics and Automation, pp. 323-344. USA, 1987, pp. 323-344.

Viola, Paul et al., "Rapid Object Detection using a Boosted Cascade of Simple Features", Proceedings of the IEEE Computer Society Conference on Computer Vision and Pattern Recognition, vol. 1, pp. 511-518, IEEE, 2001, pp. 511-518.

Wei, Guo-Qing et al., "Implicit and Explicit Camera Calibration: Theory and Experiments", IEEE Transactions on Pattern Analysis and Machine Intelligence, 16(5), May 1994, pp. 469-480.

Wengert, Christian et al., "Fully Automatic Endoscope Calibration for Intraoperative Use", Computer Vision Laboratory, ETH Zurich, Switzerland, 2006.

Zhang, Chao et al., "Nonlinear Distortion Correction in Endoscopic Video Images", Penn State University, Department of Electrical Engineering, 2000 IEEE, 2000.

Zhang, Zhengyou "A Flexible New Technique for Camera Calibration", IEEE Transactions on Pattern Analysis and Machine Intelligence, vol. 22, Nov. 2000, pp. 1330-1334.

Alexa, M. , et al., "Garment Motion Capture Using Color-Coded Patterns", EUROGRAPHICS 2005, vol. 24, No. 3, 2005.

* cited by examiner

Arbitrary sample

Arbitrary sample

Accepted sample

Refined initial guess

Two iterations

Convergence after 9 iterations

Algorithm 1 Chessdetect

1: $M_0 \leftarrow \{x_1, x_2, ..., x_{12}\}$ ▷ corners of initial guess model
2: $t \leftarrow 0$
3: Initialize $H_0$ and $d_0$ as described in Section 3.1
4: repeat
5:   $I_t \leftarrow \{\}$
6:   for all $x \in M_t$ do
7:     Find $p^*$ using (8)
8:     $x^* \leftarrow$ center vertex of $M_c^*$   ▷ see Section 3.2.4
9:     if constraints are met then
10:       $I_t \leftarrow I_t \cup x^*$
11:     else
12:       $M_t \leftarrow M_t \setminus x$
13:     end if
14:   end for
15:   Find $H_{t+1}$ and $d_{t+1}$ using (14)
16:   $M_{t+1} \leftarrow M_t \cup \{n(v) \mid v \in M_t\}$
17:   $t \leftarrow t+1$
18: until $|I_{t-1}| = |I_{t-2}|$   ▷ no more points found

Fig. 7

PATTERN DETECTION

CROSS-REFERENCES TO RELATED APPLICATIONS

This application is a continuation of copending International Application No. PCT/EP2016/071724, filed Sep. 14, 2016, which is incorporated herein by reference in its entirety.

Embodiments of the present invention refer to a method and an apparatus for detecting a known pattern having homogenous areas. Advantageous embodiments refer to robust chessboard detection for a geometric camera calibration.

BACKGROUND OF THE INVENTION

Nearly every camera and especially cameras having a wide viewing angle have to be calibrated. Such wide viewing angle cameras are often used for endoscopes.

Endoscopic procedures are common clinical practice for a variety of diseases. Among others, minimally invasive surgery with endoscopic instruments is performed on abdominal organs (laparoscopy), joints (arthroscopy), or the brain (neurosurgery). Endoscopy involves good orientation, coordination, and fine motor skills of the surgeon. Therefore, computer systems that offer navigation support to the physician are of increasing significance. Navigation systems which relate the view through the endoscope to the geometry of the surgical site may use a calibrated camera. In this context, calibration refers to the process of estimating the intrinsic camera parameters. The intrinsic parameters of a distorted pinhole camera model consist of the focal length, the principal point, as well as radial and tangential distortion parameters.

Usually, camera calibration is a two-step process: First, a known calibration pattern is detected in the images. Second, the calibration parameters are estimated based on correspondences between points on the pattern and their projections in the images.

Camera calibration for endoscopic applications poses several challenges. Endoscopes often have wide-angle lenses with typical viewing angles between 90° and 120°. Therefore, distortion effects are very strong. Due to the optical setup of the endoscope, the light source is close to the optical center. This often causes strong inhomogeneity, glare, vignetting effects, and high image noise in badly illuminated regions. Within a clinical environment, non-technical staff is expected to be able to perform the calibration process quickly. Consequently, the calibration method is expected to reliably handle motion blur, defocussing, and recordings of partially captured patterns.

Various patterns have been developed. Still, the planar chessboard pattern is most established. Mallon et al. [8] have shown that the chessboard pattern outperforms circle patterns in the case of strong perspective or radial distortion. Self-identifying targets (like ARTags [6]) are more complex and may use high resolution and low-noise images.

Below, approaches according to the state-of-the-art will be discussed: Ernst et al have introduced a method for robust color chart detection using a region-based approach (patent WO 2012113732 A1) [5]. Barreto et al introduced a calibration method that has been specifically designed to comply with the requirements of endoscopic camera calibration [1] (patents WO 2013015699 A1 and WO 2014054958 A2) and refined subsequently [9, 10]. Fuersattel et al present another approach that detects (partially occluded) checkerboard patterns under worse lightening conditions and in low-resolution images [7].

However, none of the above described concepts are robust enough to handle strong distortions, image blur, noise, and partially visible targets. Therefore, there is the need for an improved approach.

The present invention provides a concept for a robust detection of a planar calibration target, i.e. like a chess board, under difficult conditions, for example, in order to enable the calibration of a camera.

SUMMARY

According to an embodiment, a method for detecting a known pattern having homogenous areas may have the steps of: taking an image of at least a portion of the known pattern; initially detecting a first region of the image, the first region including at least two homogenous areas, to estimate at least one region parameter for the first region; detecting a feature of the known pattern within a second region of the image, the second region including at least two homogenous areas and being adjacent to the first region, to obtain at least one region parameter of the feature within the second region.

According to an embodiment, a computer-implemented method for detecting a known pattern having homogenous areas may have the steps of: taking an image of at least a portion of the known pattern; initially detecting a first region of the image, the first region including at least two homogenous areas, to estimate at least one region parameter for the first region; detecting a feature of the known pattern within a second region of the image, the second region including at least two homogenous areas and being adjacent to the first region, to obtain at least one region parameter of the feature within the second region; wherein the step of detecting the feature is iterated for a third region of the image, the third region including at least two homogenous areas and being adjacent to the first and/or the second region to obtain at least one region parameter for the feature within the third region; wherein the step of detecting a feature of the known pattern is iterated for another region in a direction extending from the first region and going through the second region and/or third region taking into account a an adapted projection model until no additional feature is found in this direction.

According to an embodiment, a computer-implemented method for detecting a known pattern having homogenous areas may have the steps of: taking an image of at least a portion of the known pattern; initially detecting a first region of the image, the first region including at least two homogenous areas, to estimate at least one region parameter for the first region; detecting a feature of the known pattern within a second region of the image, the second region including at least two homogenous areas and being adjacent to the first region, to obtain at least one region parameter of the feature within the second region; wherein the determining of the feature within the first, second, third or another region includes a corner detection; and wherein the corner detection includes the substep of morphing the template in accordance to a morphing parameter to obtain a morphing model for the first, second, third or another region; and wherein the method further includes this step of determining a projection model based on the one or more determined region parameters and on the assumption that each vertex of the respective morphable model of the first, second, third or another region is projected into the image and/or distorted.

According to another embodiment, a method for calibrating a camera may have the steps of: detecting a known pattern having homogenous areas; and calculating camera calibration parameters describing the behavior of the camera based on the at least one region parameter for the first region and/or on the at least one region parameter of the feature within the second region.

According to another embodiment, a non-transitory digital storage medium may have a computer program stored thereon to perform the inventive method for detecting a known pattern having homogenous areas, when said computer program is run by a computer.

According to another embodiment, an apparatus for detecting a known pattern having homogenous areas may have: an input interface for receiving an image of the known pattern; a calculation unit for initially detecting a first region of the image, the first region including at least two homogenous areas, to estimate at least one region parameter for the first region; and for detecting a feature of the known pattern within a second region of the image, the second region including at least two homogenous areas and being adjacent to the first region, to obtain at least one region parameter of the feature within the second region.

According to another embodiment, an apparatus for detecting a known pattern having homogenous areas may have: an input interface for receiving an image of the known pattern; a calculation unit for initially detecting a first region of the image, the first region including at least two homogenous areas, to estimate at least one region parameter for the first region; and for detecting a feature of the known pattern within a second region of the image, the second region including at least two homogenous areas and being adjacent to the first region, to obtain at least one region parameter of the feature within the second region; wherein the step of detecting the feature is iterated for a third region of the image, the third region including at least two homogenous areas and being adjacent to the first and/or the second region to obtain at least one region parameter for the feature within the third region; wherein the step of detecting a feature of the known pattern is iterated for another region in a direction extending from the first region and going through the second region and/or third region taking into account a an adapted projection model until no additional feature is found in this direction; or wherein the determining of the feature within the first, second, third or another region includes a corner detection; and wherein the corner detection includes the substep of morphing the template in accordance to a morphing parameter to obtain a morphing model for the first, second, third or another region; and wherein the method further includes this step of determining a projection model based on the one or more determined region parameters and on the assumption that each vertex of the respective morphable model of the first, second, third or another region is projected into the image and/or distorted.

Embodiments of the present invention refer to a method for detecting a known pattern having homogeneous areas, e.g. a chessboard. The method comprises the steps of taking an image of the known pattern or, of at least a portion of the known pattern, and performing detection. Detection comprises at least two steps; namely, an initial detection of a first region of the image and the detection of a feature of the known pattern within a second region of the image. The first region (e.g. a 3×3 portion of a chessboard) comprises at least two homogenous areas. The second region (e.g. 2×2 checkerboard model) is arranged adjacent to the first region also comprises at least two homogeneous areas. The initial detection has the purpose to estimate at least one region parameter, such as a position of the region of the pattern, and/or orientation of the region or distortion of same. Starting from this, the second region can be selected in which a feature, such as a corner of the checkerboard is detectable. This second detection step has the purpose to obtain at least one region parameter such as the position of a characteristic feature within the second region, wherein the characteristic (exemplarily) means that the feature enables a mapping to the known pattern.

Embodiments of the present invention are based on the knowledge that a calibration process can be improved, when the process for detecting the calibration target, here, the known pattern having homogeneous areas, can be performed in a robust and precise manner. According to the teachings disclosed herein, the detection of the pattern/chessboard is performed according to a two-stage strategy. Within the first stage, a raw estimation of a portion of the calibration target, e.g. 3×3 portion of the chessboard is performed in order to detect this portion and to obtain first model parameters, such as the raw orientation of the pattern in the space. Starting from this first guess, regions adjacent to the already detected first region are investigated in order to detect features within the adjacent regions. Starting from the first guess of the first portion the raw position of the pattern should be known, however, the exact (or more exact) position of the known pattern in the space can be refined by the determination of features. The feature may be a corner such that the determination may, for example, be a corner determination. This approach is reliable and handles strong distortion, image blur, noise and partially visible targets. It is robust and provides a precise determining of the calibration target for the camera calibration, e.g. of an endoscopic camera.

According to further embodiments, the feature determination may be iterated for further regions, e.g. regions in a direction extending from the first region in a direction through the second region, such that a further refinement can be achieved. According to another embodiment the featured detection can be iterated for a third region adjacent to the first or the second region in order to obtain additional model parameters (a model parameter for a third region e.g. a position of the corner in the third region). Further iterations may be performed for further regions until no additional feature is found. The iteration may be performed within a first direction extending from the first region through the second region or another direction extending from the first region not along the first direction. According to embodiments, the region in which the next feature determination is performed is selected based on an adapted camera model (e.g. describing the distortion of the camera) and based on a simulated model of the calibration target (wherein the simulation is performed based on the previously determined features and/or the initial detection of the characteristic portion of the calibration target). This means, in other words, that according to embodiments, after the detection of the feature within the first, second, third or another region, the camera calibration parameters describing the behavior of the camera, are updated, such that the successive (optional) step of selecting the second, third or another region is performed based on the updated camera parameters.

According to embodiments the feature detection is a corner detection. For example, when considering a chessboard as the calibration target, the corner detection may be realized by using templates, each being a checkerboard model in a 2×2 format. The detection is performed by a comparison between the template and the image of the first, second, third or another region of the image. Since typically the corners are not rectangular the template can be morphed during the comparison in order to adapt same to the corner. According to embodiments, the comparison between the template and the image taken is performed by determining a correspondence between a portion within the first, second, third or another region of the image and one or more templates. Here, an intensity difference between mean pixel values of two fields of the checkerboard model can be determined, where the maximum of the intensity difference indicates a matching. Alternatively, a standard deviation of the two fields of the checkerboard model can be determined, wherein a minimum indicates matching. This approach may be expressed with the following mathematical formula:
the mean pixel values ($\mu_{ra}$, $\mu_{rb}$) are approximated using the formula:

$$\hat{\mu}: \mathbb{R}^{M \times 2} \times \mathbb{R}^{w \times h} \to \mathbb{R}(M', I_\Sigma) \mapsto \mu_r := \frac{s_r}{a_r};$$

wherein the standard deviation ($\sigma_{ra}$, $\sigma_{rb}$) are approximated using the following formula:

$$\hat{\sigma}: \mathbb{R}^{M \times 2} \times \mathbb{R}^{w \times h} \times \mathbb{R}^{w \times h} \to \mathbb{R}$$

$$(M', I_\Sigma, [I^2]_\Sigma) \mapsto \sigma_r := \sqrt{\frac{\hat{s}(M', [I^2]_\Sigma)}{a_r} - \mu_r^2};$$

wherein $a_r$ is defined by $$\hat{a}: \mathbb{R}^{M \times 2} \to \mathbb{R}$$

$$M' \mapsto a_r := \frac{1}{2} \sum_{i=k_r}^{l_r} (\check{u}_i \check{v}_{i+1} - \check{u}_{i+1} \check{v}_i);$$

and
wherein $1_s$ is defined by $$I_\Sigma(x, y) := \sum_{i \leq x, j \leq y} I(i, j)$$

wherein $s_r$ is a sum of pixel values and wherein $[I^2]_\Sigma$ is an integral image where each pixel value is squared before the summation.

According to embodiments, the morphing of the templates may be performed during the detection, wherein a morphing parameter is used to perform the morphing. This may mathematically be expressed as follows:

$$T_k := \begin{bmatrix} x_{k1} & y_{k1} \\ \vdots & \vdots \\ x_{kM} & y_{kM} \end{bmatrix}, \text{ with } k \in [0, N]$$

wherein the morphing is performed using a morph parameter vector:
p:=($\Delta_x$, $\Delta_y$, s, $\alpha_1$, ..., $\alpha_N$), wherein the parameter $\alpha_k$ is associated with each deformation target $T_k$ for k>0 to specify the weight of each template in the linear combination and wherein $\Delta_x$ and $\Delta_y$ are global translations and wherein s is a scaling parameter.

In this context it should be noted that according to embodiments the morph model may be defined as follows:

$$m: \mathbb{R}^{N+3} \to \mathbb{R}^{M \times 2}$$

$$p \mapsto M = \begin{bmatrix} \check{x}_1 & \check{y}_1 \\ \vdots & \vdots \\ \check{x}_M & \check{y}_M \end{bmatrix} := s \left( T_0 + \sum_{k=1}^{N} \alpha_k (T_k - T_0) \right) + \begin{bmatrix} \Delta_x & \Delta_y \\ \vdots & \vdots \\ \Delta_x & \Delta_y \end{bmatrix}.$$

According to further embodiments, a determination of a projection model may be performed. This projection model is based on the respective morphable model and the assumption that each vertex of the respective morphable model (belonging to the first, second, third or another region) is linearly projected into the image.

According to embodiments, the so-called homography matrix is used which defines the linear projection of each vertex from M into the image frame. This is defined by the following formula:

$$\begin{bmatrix} \tilde{u} \\ \tilde{v} \\ \tilde{w} \end{bmatrix} = H \begin{bmatrix} \check{x} \\ \check{y} \\ 1 \end{bmatrix},$$

wherein
$u = \tilde{u}/\tilde{w}$ and $v = \tilde{v}/\tilde{w}$,
wherein
$\check{u} := u(1+k_1 r^2 + k_2 r^4) + (p_2(r^2+2u) + 2p_1 uv)$, $\check{v} := v(1+k_1 r^2 + k_2 r^4) + (p_1(r^2+2v) + 2p_2 uv)$, where the coefficients $k_1$, $k_2$ cause radial distortion and $p_1$, $p_2$ cause tangential distortion, and where the radius r is the distance of each vertex to the distortion center ($c_x$, $c_y$).

According to embodiments, the initial detection is performed using a so-called discriminant criterion which has to be calculated for the different portions/locations/subregions of the first region. Here, this calculation is performed for different (sub-)regions and/or different distributions of the pixel within the entire image in order to find the first region. The first region is found when the discriminant criterion is fulfilled on maximum. Here, it is beneficial that the calculation is performed just for some pixels, e.g. five pixels per area or, in general, a limited number of pixels less than all pixels of the area, such that the calculation can be done quickly. Note that the number of pixels is based on the trade-off between the calculation performance and the calculation accuracy, since a larger number of pixels allow the determination more accurately.

According to further embodiments, the calculation of the discriminant criterion may be based on the following mathematical relationship:

$$s_p := \frac{\hat{\mu}_1 - \hat{\mu}_2}{\hat{\sigma}_1 + \hat{\sigma}_2},$$

wherein $\hat{\sigma}_1$ and $\hat{\sigma}_2$ denote the standard deviation, and wherein $\hat{\mu}_1$ and $\hat{\mu}_2$ denote the corresponding intensity means, and where p denotes the dependency on the region parameters; and/or wherein the discriminant criterion is calculated for different combinations of the region parameters to find a proper guess for the region parameters belonging to the portion. This approach enables performing a quick estimation as to how the chessboard is arranged within the space.

Another embodiment provides a method for calibration of a camera, a random method uses the pattern detection as described above and the calculation of at least a camera calibration parameter, e.g. the lens distortion. This calibration method may be beneficially used for endoscopic cameras since the same have often a strong lens distortion.

Another embodiment provides the computer program which enables when running on a computer to perform one of the above method steps. According to a further embodiment an apparatus is provided enabling execution of the above method.

BRIEF DESCRIPTION OF THE DRAWINGS

Embodiments of the present invention will be detailed subsequently referring to the appended drawings, in which:

FIG. 7 shows an algorithm for performing the pattern detection.

DETAILED DESCRIPTION OF THE INVENTION

Below, embodiments of the present invention will subsequently be discussed referring to the figures. Here, identical reference numbers are provided to elements or steps having identical or similar functions. Therefore, the description thereof is interchangeable and mutually applicable.

Figure 1A:
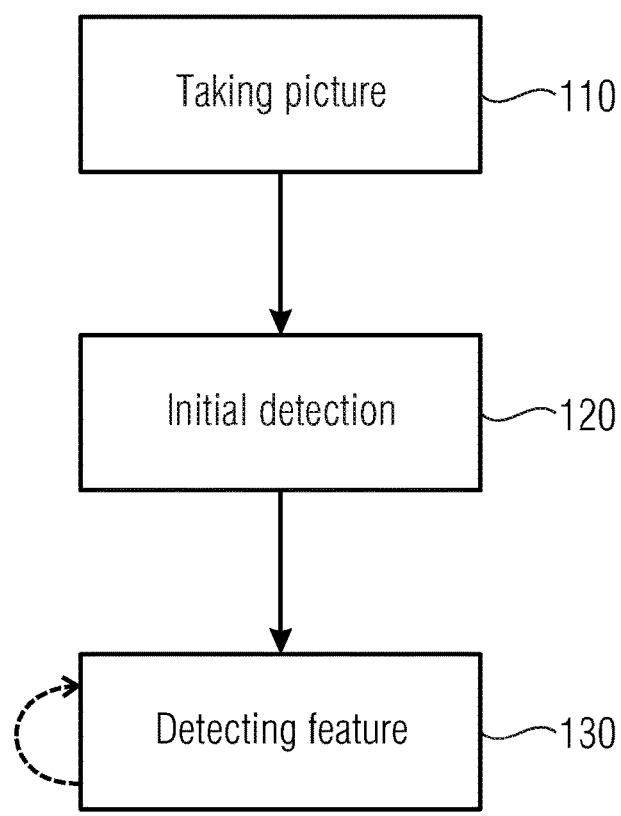
FIG. 1a shows a schematic flow chart illustrating the method for calibrating a camera according to a basic embodiment.
Figure 1A:
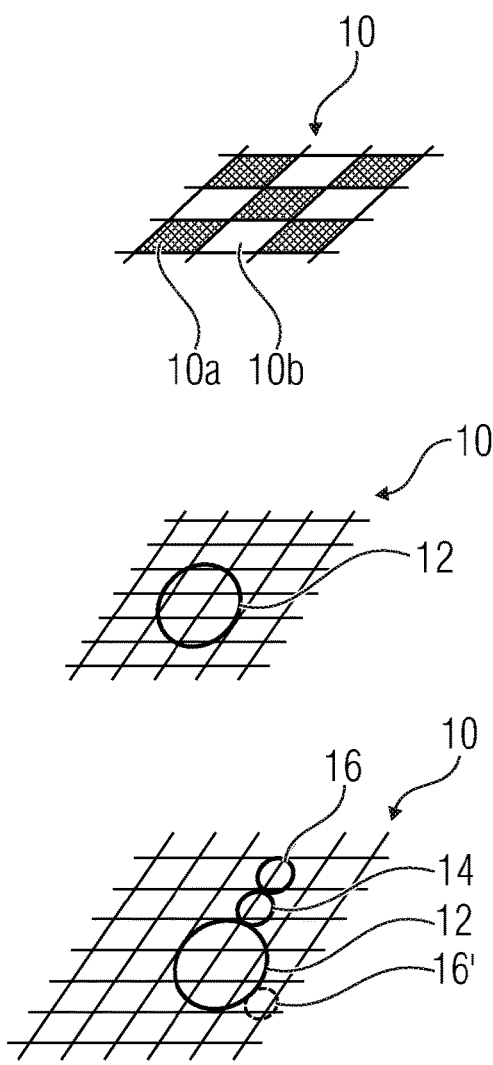

FIG. 1a shows the basic method 100 for detecting a known pattern 10 having homogeneous areas 10a and 10b. The known pattern 10 may be, for example, a chessboard or another regular or irregular pattern e.g. comprising circles or having QRcode arrangement. Typically, but unnecessarily, the areas 10a and 10b are black and white, such that the same offer a high contrast. However, according to further embodiments, the homogeneous areas may have a different color. The method 100 comprises the three basic steps 110, 120 and 130.

In the first step 110, a picture of the entire pattern 10 or a portion of the pattern 10 is taken. Starting from this picture, the pattern detection is performed using the steps 120 and 130.

Within the step 120 an initial detection of a first region 12 is performed. This initial detection may, for example, be performed using a trial and error procedure, namely by calculating so-called discriminant criterion for different regions (c.f. patched cycle 12') within the image of the pattern 10. Here, different positions within the image and/or different orientations of the region 12 may be calculated in order to achieve the best fulfilment of the discriminant criterion. This second step 120 of the detection has the purpose to get a raw estimation of at least one region parameter for the first region, such as the position of the region.

Regarding this step 120, it should be noted that this step may be optional, and be performed just based on the calculation of the discriminant criterion for a limited number of pixels in order to perform the initial estimation quickly. Based on this first region parameter, it is, theoretically, possible to calculate the orientation of the pattern within the space, such that this knowledge can be used for a camera calibration. However, practically the first guess of the region parameter is used for two issues, commonly for estimating the camera calibration parameter and, especially as input for the next step 130 of detecting a feature of the known pattern, e.g. a corner of the chessboard.

Since a first region parameter (c.f. step 120) is known, the known pattern 10 can be arranged virtually within the space, such that the approx. position of the feature to be determined within the step 130 is known. Starting from this knowledge the second region 14 in which the feature is searched (is selected). Here, the second region 14 is adjacent to the first region 12. "Here" means adjacent, for example, that the second region 14 abuts the first region 12 or that it lies in the vicinity, wherein another region may be arranged in between. Based on this selected second region 14, the step 130 of detecting the feature of the known pattern is performed in order to obtain at least one region parameter of the feature, e.g. the exact position of a corner of the chessboard. Note that the second region 14 can overlap the first region 12 or can be a part of the first region 12. Thus, the step 130 is performed for determining the feature/corner in the region 12 (as described below).

Since now, at least one region parameter for a region is known, the pattern can be determined. However, in order to determine the same more precisely, it is possible, according to further embodiments, to iterate the step 130 for a third or further region (arrow having broken lines). Here, the third region (c.f. reference number 16) may be arranged in the direction extending from the first region 12 through the second region 14 to the border of the image 10. Alternatively, the third region may be arranged in another region, (c.f. third region 16'). Typically, the step 130 is, according to embodiments, iterated until no additional feature is found. For each iteration, the camera calibration parameter may be updated as will be discussed with respect to FIG. 1b.

Figure 1B:
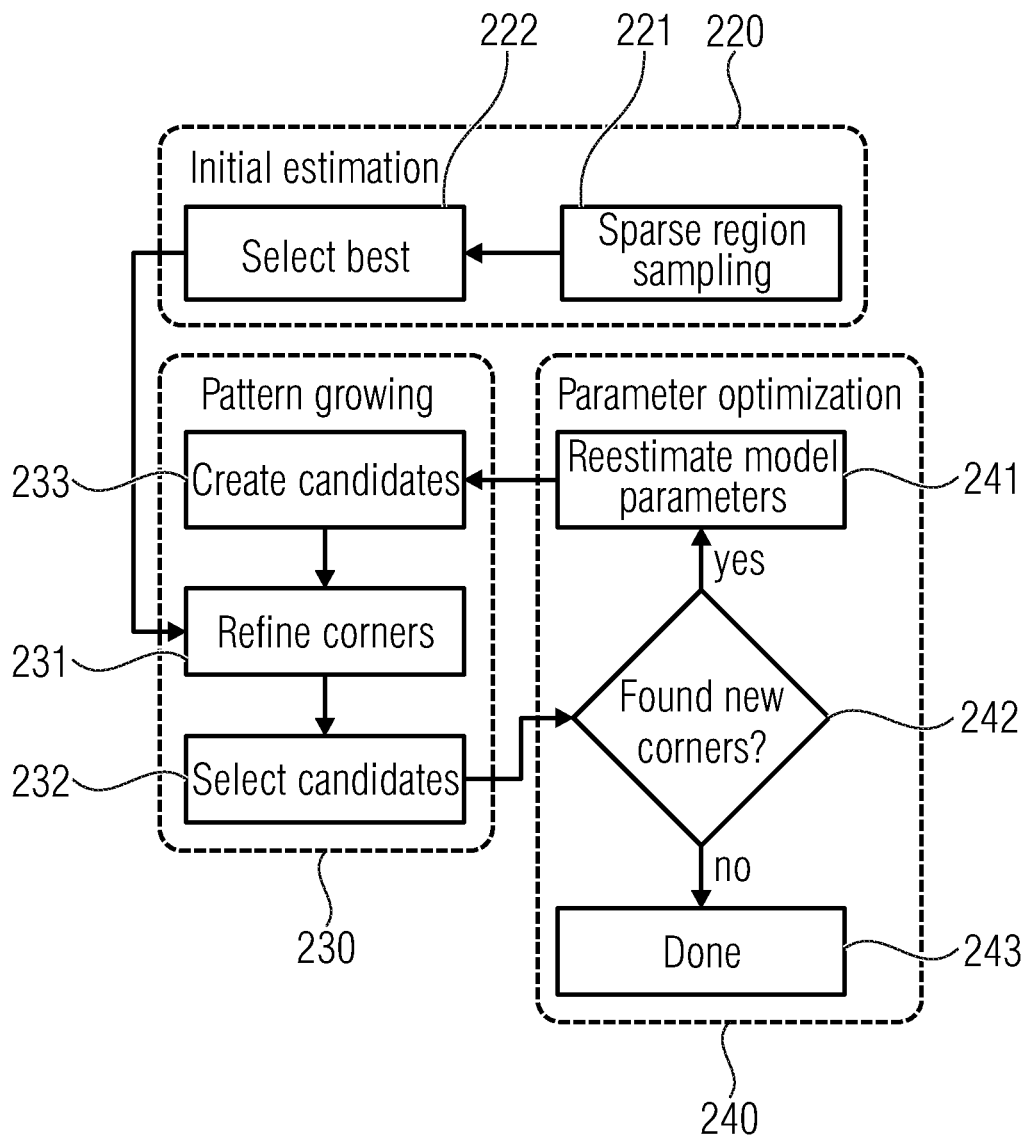
FIG. 1b shows another schematic flow chart illustrating an enhanced version of the method for calibrating a camera according to an enhanced embodiment.

FIG. 1b shows the method 200 which consists of three phases, namely, the initial estimation phase 220, the pattern growing phase 230 and the optional parameter optimization phase 240.

Figure 2A:
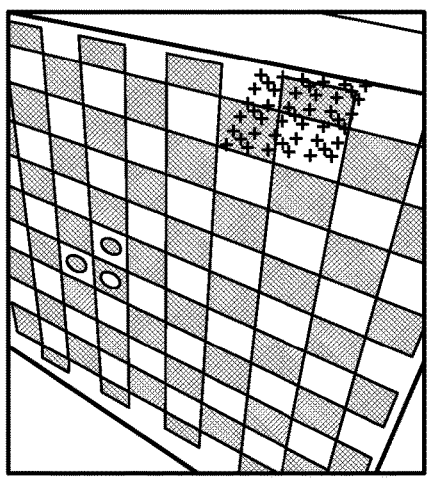
FIGS. 2a to 2g illustrate seven images of a calibration target during six different steps of the method for calibrating the camera and adjusting the camera calibration parameters according to embodiments.
Figure 2B:
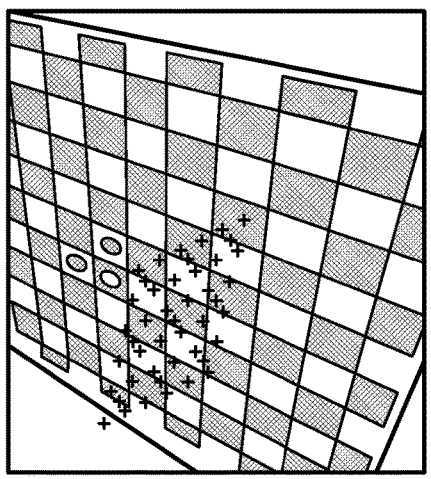
Figure 2C:
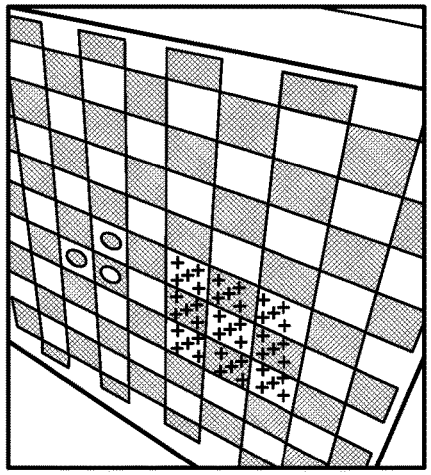

In the initial phase 220, a so-called spare sampling strategy 221, is used to find the initial guess for the checkerboard position and size. In context to this, it is referred to FIGS. 2a and 2c illustrating this spare sampling strategy. This spare sampling strategy substantially complies with the above described approach of finding the first region 12 (c.f. step 120).

Within the step 222 the best match is selected from which the pattern growing phase 230 is started. Within this pattern growing phase 230, the guess is refined to subpixel precise corner locations. This step is called refined corners 231. Here, according to embodiments, an approach using differently morphed templates is used. The templates may also be referred to as morphable corner models. Here, comparison between the template and the image within the second region 14 is performed at different positions within the second region 14, wherein the morph parameters are varied for morphing the template to adapt (distorting, shifting) same to the corner which should be detected. The result of the comparison is that one morphed template achieves at one position the best matching. This position is elected as a region parameter, c.f. step 232.

The determined region parameter is used for the parameter optimization (c.f. 240). Here, the camera calibration (model) parameters are re-estimated, as illustrated by the step 241.

Starting from the re-estimated camera calibration (model) parameter, the pattern growing phase 230 is continued. Here, the step 233 of creating a new candidate, namely, of searching a new region, e.g. the third region 16, is performed. When this candidate is found, the step 231 and 232 are iterated until no new feature (corner) is found. This decision is taken within the phase parameter optimization 240, namely, using the decision step 242. This means in other words that the expansion phase iteratively searches new checkerboard corners/features in the vicinity of the detected corners and updates the camera parameters (c.f. step 241). This is illustrated, when looking at FIG. 2, by FIGS. 2e and 2f.

Figure 2D:
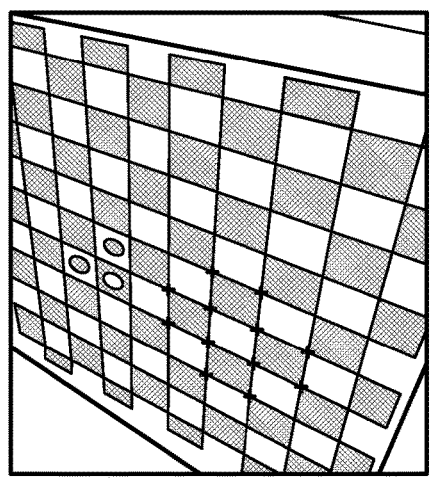
Figure 2E:
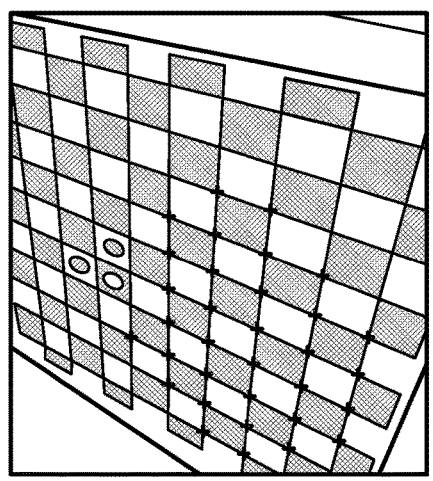
Figure 2F:
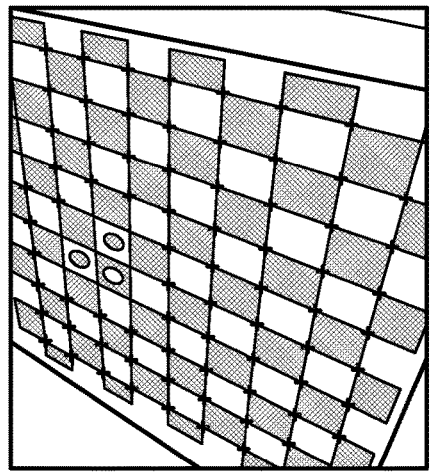
Figure 2G:
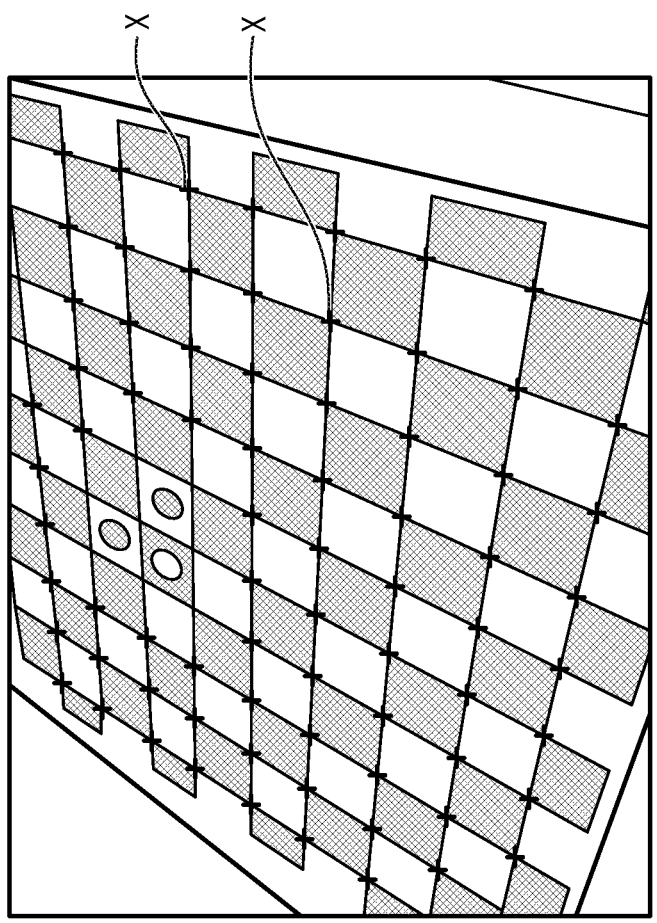

After no new features/corners are found, the method 200 is finalized (c.f. 243). Here, all features/corners (reference number X) are detected, as illustrated by FIG. 2g.

This method 200 and especially the phases 220, 230 and 240, are now discussed in more detail.

Initial Estimation Phase 220

The method 200 has an initial estimate of the checkerboard size, pose and position. Here, the image with a 3×3 checkerboard model (see FIG. 3) is regularly scanned to find positions of high correspondence between the checkerboard model and the image (see FIGS. 2a and 2b). At its position, the intensity of five points P within each of the nine checkerboard patches is sampled.

Figure 3:
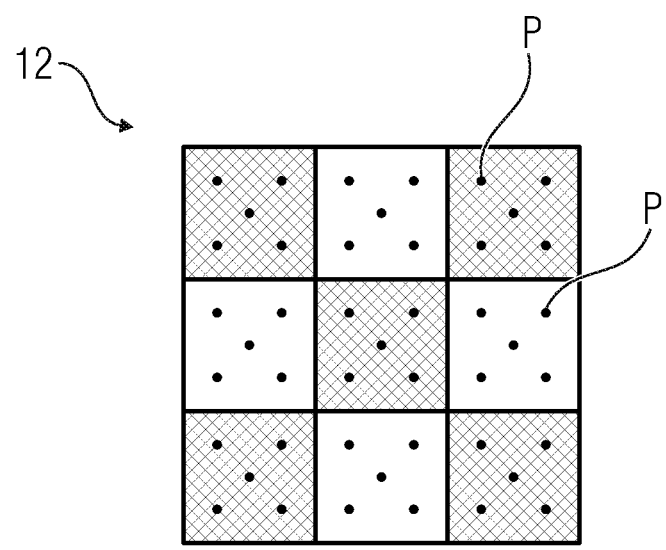
FIG. 3 shows a checkerboard model together with sampling points used for performing the initial estimation according to embodiments.

FIG. 3 shows a random sampling model used for finding the region 12. The points, marked by the reference numeral P, indicate samples. Note that the model consists of two groups (black and white) of homogeneous areas.

The regular structure of a checkerboard allows its division into two of homogeneous intensities. A successful initial guess is characterized by a high intensity difference between both groups and a low intensity variance within each group. The Fisher linear discriminant is suited to identify the best guesses. It is commonly used to maximize the spread of samples in pattern classification problems [4]. Let $\hat{\sigma}_1$ and $\hat{\sigma}_2$ denote the standard deviation of all samples in the respective group. Let $\hat{\mu}_1$ and $\hat{\mu}_2$ denote the corresponding intensity means. The correspondence between the checkerboard model and the image is defined—based on the idea of the Fisher discriminant—as:

$$s_p := \frac{\hat{\mu}_1 - \hat{\mu}_2}{\hat{\sigma}_1 + \hat{\sigma}_2},$$

where p denotes the dependency on the model parameters (i.e. size, pose and position).

Testing for different combinations of size, position, sharing and rotation is performed to find a proper guess. Finally, the sample that maximizes $|s_p|$ is chosen to calculate an initial homography $H_0$ based on the model and image coordinates. Distortion has not been taken into account, and the distortion $d_0$ is initialized to an identity mapping. The complete procedure is denoted as spare region sampling.

Phase Pattern Growing 230

Based on the initial guess, the expansion phase iteratively detects new checkerboard corners. For each detected checkerboard corner, it regards the four direct neighbors as corner candidates and performs the corner detection. Then, it refines the initial guess accordingly. The pattern growing phase mainly consists of the region-based corner detection, which makes this method very robust against blur and noise. In order to explain the process in detail, the morphable model is introduced that allows for a highly flexible parameterization and its projection into the image space.

The morphable model is defined by a linear combination of N deformation templates with coefficients $\alpha_k$ and a default template. The coefficients determine the shape of the model. The choice of templates offers fine-grained control over the parameterization of the model shape. That, in turn, simplifies fitting the model onto the image. In this embodiment, a morphable corner model m is used that consists of seven elementary templates $T_k$ (see FIG. 4). Each template consists of M vertices. With N:=6, the resulting formula is:

$$T_k := \begin{bmatrix} x_{k1} & y_{k1} \\ \vdots & \vdots \\ x_{kM} & y_{kM} \end{bmatrix}, \text{ with } k \in [0, N]$$

Figure 4:
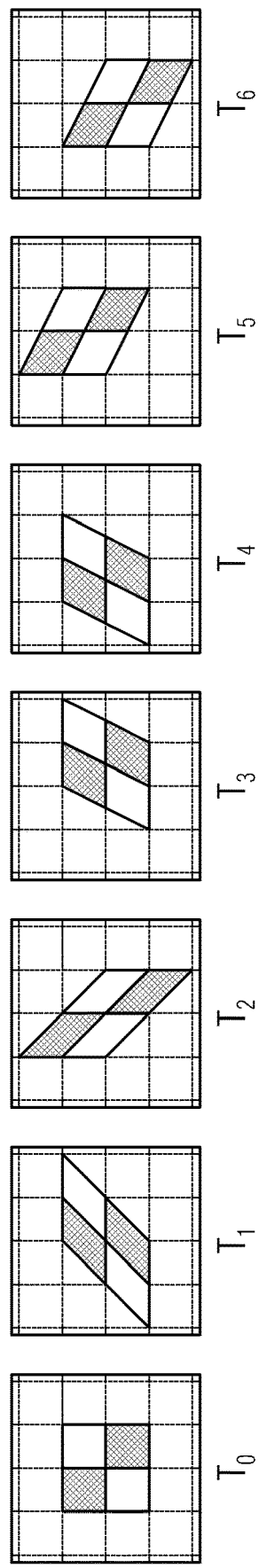
FIG. 4 shows dramatic representations of seven differently morphed templates which are used for the feature detection/corner detection according to embodiments.

$T_0$ is the unmorphed default template (see FIG. 4). One parameter $\alpha_k$ is associated with each deformation target $T_k$ for k>0 to specify the weight of each template in the linear combination. In addition, a global translation $\Delta_x$, $\Delta_y$ and a scaling parameter s is introduced. The morph parameter vector combines all parameters in:

$$p:=(\Delta_x,\Delta_y,s,\alpha_1,\ldots,\alpha_N)$$

The morphable model combines the templates using p:

$$m: \mathbb{R}^{N+3} \to \mathbb{R}^{M \times 2}$$

$$p \mapsto M = \begin{bmatrix} \check{x}_1 & \check{y}_1 \\ \vdots & \vdots \\ \check{x}_M & \check{y}_M \end{bmatrix} := s\left(T_0 + \sum_{k=1}^{N} \alpha_k (T_k - T_0)\right) + \begin{bmatrix} \Delta_x & \Delta_y \\ \vdots & \vdots \\ \Delta_x & \Delta_y \end{bmatrix}.$$

The morphable model is influenced by the point distribution model (pdm) by Cootes and Taylor [3]. The deviation of each deformation template from the default template is similar to the modes of variation in the pdm. However, the morphable model artificially introduces more degrees of freedom to yield a simpler error surface. It additionally accounts for scaling and translation in the model coordinate frame.

FIG. 4 shows different morphed templates. $T_0$: unmorphed template; $T_1$ and $T_2$: shearing at the model center; $T_3$ to $T_6$: shearing by moving only the top, bottom, left and right side.

Figure 5A:
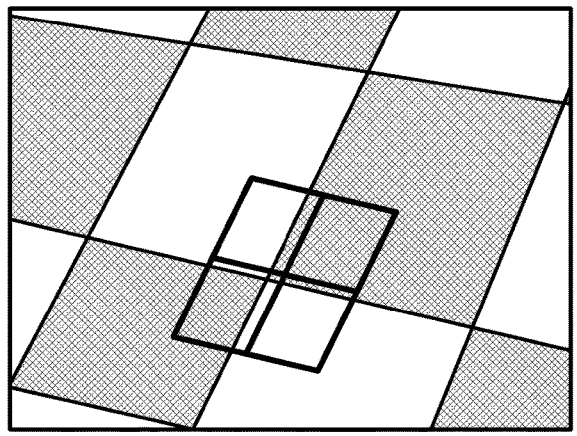
FIGS. 5a and 5b show two different schematic views for illustrating the principal of the subpixel precise corner detection using a 2×2 checkerboard model before and after the optimization of the morph template according to embodiments.
Figure 5B:
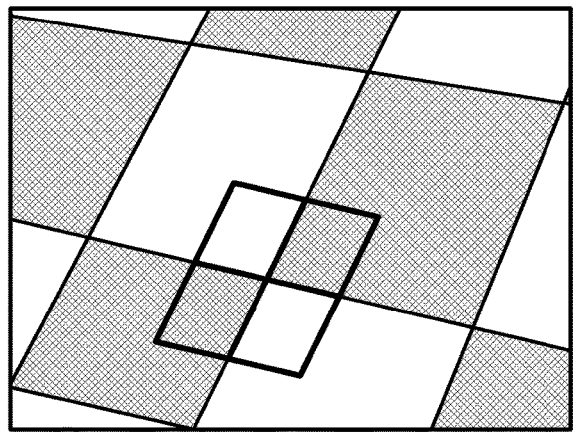

With respect to FIG. 5, subpixel precise corner detection using a 2×2 checkerboard is illustrated. Here, FIG. 5a shows the corner model before optimization, whereas FIG. 5b shows the corner model after the optimization process.

Projection Model

The morphable model resides in the model coordinate frame and M is a matrix of model coordinates. For example, planar calibration targets are used, wherein also the usage of non-planar targets would be possible. Therefore, the image coordinates of the model lie in a two dimensional linear manifold of $\mathbb{R}^3$. A homography defines the linear projection of each vertex $(\breve{x}, \breve{y})$ from M into the image frame by:

$$\begin{bmatrix} \breve{u} \\ \breve{v} \\ \breve{w} \end{bmatrix} = H \begin{bmatrix} \breve{x} \\ \breve{y} \\ 1 \end{bmatrix}.$$

The homography matrix $H \in \mathbb{R}^{3 \times 3}$ is defined up to a scale [14]. The inhomogeneous representation of the image coordinates can be got by $u = \breve{u}/\breve{w}$ and $v = \breve{v}/\breve{w}$, respectively. Afterwards, the Brown-Conrady model is applied to account for non-linear radial and tangential distortion [2]:

$$\breve{u} := u(1 + k_1 r^2 + k_2 r^4) + (p_2(r^2 + 2u) + 2p_1 uv),$$

$$\breve{v} := v(1 + k_1 r^2 + k_2 r^4) + (p_1(r^2 + 2v) + 2p_2 uv),$$

where the coefficients $k_1$, $k_2$ cause radial distortion and $p_1$, $p_2$ cause tangential distortion, and where the radius r is the distance of each vertex to the distortion center $(c_x, c_y)$.

$$r^2 = (u - c_x)^2 + (v - c_y)^2.$$

The distortion parameter vector summarizes all coefficients in $d := (c_x, c_y, k_1, k_2, p_1, p_2)$. The combination of the linear and non-linear transform yields:

$$m' : \mathbb{R}^{N+3} \times \mathbb{R}^{3 \times 3} \times \mathbb{R}^6 \to \mathbb{R}^{M \times 2}$$

$$(p, H, d) \mapsto M' = \begin{bmatrix} \breve{u}_1 & \breve{v}_1 \\ \vdots & \vdots \\ \breve{u}_M & \breve{v}_M \end{bmatrix}$$

The number of coefficients used for distortion modeling has an impact on the accuracy of the model. Tsai points out that for industrial machine vision applications, it is adequate to model only radial distortion with one coefficient [11]. Barreto et al show that for endoscopy applications it can be advantageous to use more than a single radial coefficient [1]. The advantageous application deals with endoscopy images that exhibit strong distortion effects. Therefore, two radial and two tangential coefficients are used, similar to others [13, 14].

Region-Based Corner Detection

The corner detection model M consists of four distinct areas that form a 2×2 checkerboard pattern (see FIGS. 4 and 5). The outline of each area is given by a sequence of vertices $(\breve{u}_i, \breve{v}_i)$, $i \in [k_r, l_r]$ with $k_{r+1} := l_r + 1$ and $l_r \geq k_r + 2$ for all $r \in [1, 4]$ Here, r denotes the index and $k_r, l_r \in [1, M]$ are the boundaries of r. The 2×2 corner model is applied to the domain of corner detection. Therefore, a criterion is needed that measures how well the model separates the four checkerboard areas in the image. A variant of the Fisher discriminant was applied to find the sample that separates the groups of black and white checkerboard patches best. Based on the same idea, a local measure is derived that provides better guidance to the optimizer for subpixel precise corner detection. The Levenberg-Marquardt method is used to minimize the model residual. To gain enough residuals, the Fisher discriminant is split into two independent terms, where each term accounts for the variance within one area and the separation from one of its neighbors. In contrast to the original formulation, absolute values are not used to allow for signed residuals, as they provide better guidance to the optimizer. Finally, the maximization is turned into a minimization problem. Let $\mu_r$ and $\sigma_r$ be the pixel value mean and the standard deviation of all pixels in area r. The separation between two areas $r_a$ and $r_b$ is defined by:

$$\frac{\sigma_{r_a} + \sigma_{r_b}}{\mu_{r_a} - \mu_{r_b}} = \frac{\sigma_{r_a}}{\mu_{r_a} - \mu_{r_b}} + \frac{\sigma_{r_b}}{\mu_{r_a} - \mu_{r_b}}.$$

The assumption is that the four areas are indexed in clockwise order, such that: $(r_a, r_b) \in \{(r_1, r_2), (r_2, r_3), (r_3, r_4), (r_4, r_1)\}$ are pairs of neighboring areas. Then, the separation of some area $r_a$ to one of its neighbors $r_b$ is derived by:

$$\hat{e} : [1, 4] \times [1, 4] \to \mathbb{R}$$

$$(r_a, r_b) \mapsto e_{r_a r_b} := \frac{\sigma_{r_a}}{\mu_{r_a} - \mu_{r_b}}.$$

With that, the separation criterion for M is defined by:

$$e := (e_{12}, e_{21}, e_{23}, e_{32}, e_{34}, e_{43}, e_{41}, e_{14})^T$$

For now, assume that the parameters H and d are roughly known for the projection of M into the image space. Therefore it is known which corner model coordinates $(\Delta_x, \Delta_y)$ potentially correspond to checkerboard corners in the image space. In the first iteration, H and d are initialized. In subsequent iterations, these estimates are updated by taking newly detected corners into consideration. The update procedure is described below. The exact image location $x^* = (\breve{u}_0^*, \breve{v}_0^*)$ of the checkerboard corner is searched for. This is done by minimizing e with respect to the morph template parameters. Therefore:

$$p^* = \underset{p}{\operatorname{argmin}} \|e\|_2$$

where p is initialized with $(\Delta_x, \Delta_y; s, 0, \dots)$. The model is translated and sheared with six different shearing templates. This simplifies minimization because it lowers the risk that the error only decreases when several parameters are adjusted simultaneously. The solution, $x^*$ is then given by the center vertex of $m'(p^*, H, d)$ (see FIG. 5b). Without loss of generality, the Levenberg-Marquardt method is used to minimize above Equation $p^*$. Note that the scale parameter s of the model controls the size of the 2×2 search template relative to the checkerboard size. For example, each patch of the search template covers approximately one fourth of the area of the checkerboard patch, if s=0:5. Applying the morph templates in model space and then mapping them to image coordinates is advantageous because: First, given a good estimate (H, d) and corner model coordinates $(\Delta_x, \Delta_y)$, the corner model fits well onto the checkerboard corner that corresponds to the given model coordinates and accounts for possible distortions right away. That is why the optimization does not need an initial guess. Second, applying the morph parameters in the model coordinate frame makes them scale independent. For example, setting $\Delta_x=1$ moves the template by the width of one checkerboard patch in the image frame, independent of the image resolution and patch size. That simplifies computing the numerical derivative of the above equation describing e, because fixed delta values can be used. In addition, that approach allows jumping easily from one potential checkerboard corner to another.

Figure 6A:
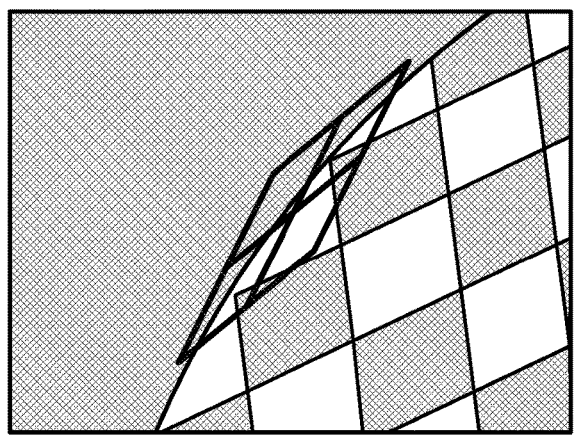
FIGS. 6a and 6b show two different views illustrating examples of candidates.
Figure 6B:
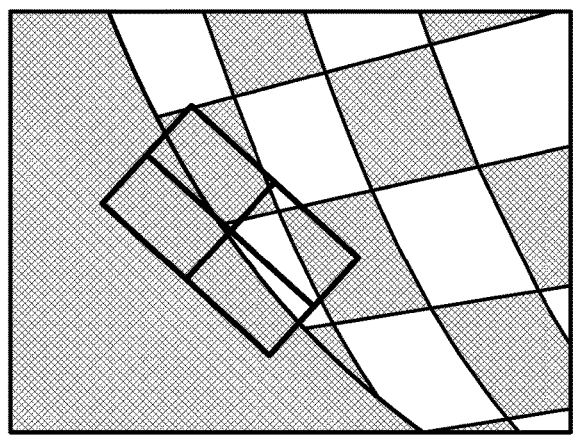

FIG. 6 illustrates two examples of candidates that have been dropped due to a degenerate result (c.f. FIG. 6a) or due to a high residual (c.f. FIG. 6b).

Candidate Selection

Not every result from the corner detection corresponds to a valid checkerboard corner in the image (see FIG. 6 for examples). Therefore, constraints are introduced that allow invalid results to be rejected. First, the detected corner is in the vicinity of the corner that is predicted by the current model state. This ensures that the optimization did not converge to a neighboring point. In practice, it is sufficient to allow a deviation of one half of the checkerboard patch width. This can be easily verified with the translation parameters $(\Delta_x, \Delta_y)$ of m. The aim is that they differ by no more than ½ from their initialization. Second, the aim is that the area of the corner detection model before the optimization will differ not too heavily from its area after the optimization. This constraint prohibits degenerate configurations. Finally, the error $\|e\|_2$ of the detection model residual is expected to fulfill a certain threshold. This rejects checkerboard corners that lie on one of the edges of the pattern.

Region Statistics

The calculation of $\mu_r$ and $\sigma_r$ is a time consuming task and needs to be carried out in every single iteration of the optimization. In a previous work, the integral image approach of Viola and Jones [12] was extended to polygonal areas [5]. The efficient approximation of region statistics within polygonal image areas is summarized here. The integral image $I_\Sigma$ of an image I is given by $I_\Sigma(x,y):=\Sigma_{i\leq x, j\leq y} I(i,j)$. The sum of pixel values $s_r$ within some polygonal area r can be approximated by:

$$\hat{s}: \mathbb{R}^{M\times 2} \times \mathbb{R}^{w\times h} \to \mathbb{R}$$

$$(M', I_\Sigma) \mapsto s_r := \frac{1}{2}\sum_{i=k_r}^{l_r} [I_\Sigma(\check{u}_i, \check{v}_{i+1}) - I_\Sigma(\check{u}_{i+1}, \check{v}_i)],$$

with $l_r+1:=k_r$. Similarly, â provides the area $a_r$ inside r:

$$\hat{a}: \mathbb{R}^{M\times 2} \to \mathbb{R}$$

$$M' \mapsto a_r := \frac{1}{2}\sum_{i=k_r}^{l_r} (\check{u}_i\check{v}_{i+1} - \check{u}_{i+1}\check{v}_i).$$

With two above Equations for $(M', I_\Sigma)$ and M', the mean pixel value $\mu_r$ within r is approximated by $$\hat{\mu}: \mathbb{R}^{M\times 2} \times \mathbb{R}^{w\times h} \to \mathbb{R}$$

$$(M', I_\Sigma) \mapsto \mu_r := \frac{s_r}{a_r}.$$

Approximating the standard deviation $\sigma_r$ within r may use a second integral image $[I^2]_\Sigma$, where each pixel value is squared before the summation. Then, the result is:

$$\hat{\sigma}: \mathbb{R}^{M\times 2} \times \mathbb{R}^{w\times h} \times \mathbb{R}^{w\times h} \to \mathbb{R}$$

$$(M', I_\Sigma, [I^2]_\Sigma) \mapsto \sigma_r := \sqrt{\frac{\hat{s}(M', [I^2]_\Sigma)}{a_r} - \mu_r^2}.$$

This way, $\mu_r$ and $\sigma_r$ can be efficiently approximated and a fast and robust local corner detector can be implemented. Bilinear sampling is applied to achieve subpixel precision. This step permits estimation 240.

Parameter Estimation

The corner refinement step finds the true image location of a checkerboard corner x* that corresponds to a corner coordinate $x=(\Delta_x, \Delta_y)$ in model space. With that relation, two sets are defined: $\mathcal{M}_t:=\{x_1, x_2, \ldots, x_{N_t}\}$ and $\mathcal{J}_t:=\{x_1^*, x_2^*, \ldots, x_{N_t}^*\}$.

Here, $x_i$ denotes the model coordinate corresponding to $x_i^*$ and $t\in\mathbb{N}$ denotes the iteration number. The outcome of the previous iteration is used, $(H_{t-1}, d_{t-1})$, and Equation for (P, H, d) is applied on every $x_i\in\mathcal{M}_t$. By this, the crossing point $x_i'$ is derived that is predicted by the current camera model. The error that is caused by the camera model with parameters H and d is given by the difference between each detected crossing point $x_i^*$ and its prediction $x_i'$. Therefore, the model parameters that minimize the error in iteration t are found by:

$$(H_t, d_t) = \underset{(H,d)}{\arg\min} \left\| \begin{bmatrix} x_1' - x_1^* \\ \vdots \\ x_{N_t}' - x_{N_t}^* \end{bmatrix} \right\|_2.$$

With respect to FIG. 7, an algorithm is shown which is configured to perform the above described method. At this point, all relevant parts have been introduced. The procedure in Algorithm 1 is now summarized. To simplify notation, the definition of the initial guess is skipped. The one used is shown in FIGS. 2c and 3 and the resulting inner corners are shown in FIG. 2d. In practice, many variants may work equally well. Line 3 initializes $H_0$ with the result of the initial guess. Then, the algorithm starts iterating, until no new corners are found. In the first iteration, the corners of the initial guess model are refined to subpixel precision, because $\mathcal{M}_0$ has been initialized with those corners (see FIG. 2d). In the subsequent iterations, the algorithm searches for checkerboard corners in the vicinity of those that have been detected during the previous iteration (see FIGS. 2e and 2f). The actual region-based corner detection is applied on line 7. Subsequently, the center vertex, i.e. the subpixel precise corner position, is extracted from the corner detection model. In line 9, it is assessed if the detected point fulfills defined quality measures. If all those constraints are met, the point is accepted. After all corner candidates in M have been detected or dropped, the model parameters are re-estimated such that they profit from the added points (see line 15). Finally, new candidates are generated for the next iteration (line 16). Here, n (v) denotes the four direct neighbors of v in model coordinates. Alternatively, the four diagonal neighbors could be used instead or in addition. For the sake of an efficient implementation, it is not mandatory to refine all $x_i\Sigma\mathcal{M}$ in every iteration. Instead, it is sufficient to refine all corners that have been added to $\mathcal{M}$ at the end of the previous iteration. Then, it is advisable to refine all corners again once the algorithm terminates using the projection parameters of the last iteration. Sometimes, it is even possible to detect new corners that have been dropped before. That is, because the projection parameters become much more accurate compared to early iterations, which leads to a better initialization of the corner detector in terms of translation and deformation.

Although the above embodiments have been discussed, focusing on a classical chessboard pattern, it is clear that the proposed method can be adapted to other calibration targets as well. For example, one solely needs to replace the corner model by an appropriate one and possibly replace the neighborhood definition for pattern growing.

In the case of the sparse region sampling, it should be noted that in the current approach, five sampling points per region/area are used totally to 45 sampling points per sample.

That number can surely be decreased. Probably two or even one sampling point will be sufficient, which would speed up the procedure. In addition, other template forms, such as a cross (5 patches) or an X (5 patches) may be useful. Of course the results may be weaker. That could be compensated by a subsequent search in the vicinity as soon as a candidate is found.

According to embodiments the morph templates may not only be used for the corner detection, but also for detecting the above mentioned circles (in case the pattern is formed by circles). Here the template comprises a circle which is differently morphed (so as to form an ellipsis). Such circle templates enable to detect the position, e.g. the center of a circle.

With regard to the corner detection it should be noted: Currently, the objective function Equation for p* does not include any constraints. Instead, constraints are checked in the aftermath. It is easy to integrate those constraints as penalty terms in the objective function. That would provide additional guidance to the optimizer. Possibly, the complete optimization problem could then be rewritten as a Lagrangian function and solved by maximizing the corresponding dual problem.

In the above embodiments, the corner detection has been described based on an approach using morph templates. However, also other corner detection techniques, like an approach based on Affine Transformation are possible.

With regard to camera models, it should be noted that there are camera models not in focus. Advantageously, a standard Brown-Conrady model is used.

Of course it is easy to plug in different camera models. For that, it is sufficient to replace the mapping from model to image coordinates as described above.

Further embodiments refer to a calibration process, e.g. for a camera of an endoscope. This approach can, according to further embodiments, be adapted to automatic multi-camera calibration.

The calibration of multi-camera setups involves that the coordinate origin remains constant across the complete sequence of calibration images. To this end, one usually places some kind of marker on at least one of the checkerboard fields to define the coordinate origin. The marker can easily be modeled and detected by the region-based approach. Alternatively, some of the checkerboard fields could have specific colors. Fields having a specific/different color enable to localize the origin of coordinate system, as well. Additionally the markers and field having the specific color enable when detected the approximated orientation of the pattern within the space, even if only a part of the pattern is shown by the image. Moreover the colored fields or markers are beneficial for an extrinsic calibration or for the calibration of a multi camera arrangement (since these calibrations typically using a plurality of frames).

With regard to the gradient descent optimization, it should be noted that instead of using the Levenberg-Marquardt method to minimize the corner detector residual, one could also apply a gradient-based approach. That may allow for a more efficient implementation, especially by replacing the numerical derivative by automatic differentiation.

With regard to the estimate chromatic aberration, it should be noted that in combination with an appropriate model, the approach could be easily extended to detect chromatic aberrations. To this end, the checkerboard detection can be applied separately on each color channel.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] J. Barreto, J. Roquette, P. Sturm, and F. Fonseca. Automatic camera calibration applied to medical endoscopy. In BMVC 2009-20th British Machine Vision Conference, pages 1-10, London, United Kingdom, 2009. The British Machine Vision Association (BMVA).

[2] D. C. Brown. Close-range camera calibration. Photogrammetric Engineering, 37:855-866, 1971.

3] T. F. Cootes and C. J. Taylor. Active shape models— 'smart snakes'. In Proceedings of the British Machine Vision Conference, pages 28.1-28.10. BMVA Press, 1992. doi:10.5244/C.6.28.

[4] R. O. Duda, D. G. Stork, and P. E. Hart. Pattern classification and scene analysis. Wiley, New York, USA, 2nd edition, 2001.

[5] A. Ernst, A. Papst, T. Ruf, and J.-U. Garbas. Check My Chart: A Robust Color Chart Tracker for Colorimetric Camera Calibration. In Proceedings of the 6th International Conference on Computer Vision/Computer Graphics Collaboration 8 Techniques and Applications, MIRAGE '13, pages 5:1-5:8, New York, N.Y., USA, 2013. ACM.

[6] M. Fiala and C. Shu. Fully automatic camera calibration using self-identifying calibration targets. 2005.

[7] P. Fuersattel, S. Dotenco, S. Placht, M. Balda, A. Maier, and C. Riess. Ocpad—occluded checkerboard pattern detector. In Applications of Computer Vision (WACV), 2016 IEEE Winter Conference on, March 2016.

[8] J. Mallon and P. F. Whelan. Which pattern? biasing aspects of planar calibration patterns and detection methods. Pattern recognition letters, 28(8):921-930, 2007.

[9] A. Malti and J. P. Barreto. Hand-eye and radial distortion calibration for rigid endoscopes. The International Journal of Medical Robotics and Computer Assisted Surgery, 9(4):441-454, 2013.

[10] R. Melo, J. Barreto, and G. Falcão. A New Solution for Camera Calibration and Real-Time Image Distortion Correction in Medical Endoscopy—Initial Technical Evaluation. IEEE Transactions on Biomedical Engineering, 59(3):634-644, March 2012.

[11] R. Tsai. A Versatile Camera Calibration Technique for High-accuracy 3D Machine Vision Metrology Using Off-the-shelf TV Cameras and Lenses. In L. Wolff, S. Shafer, and G. Healey, editors, IEEE Journal of Robotics and Automation, pages 221-224. USA, 1987.

[12] P. Viola and M. Jones. Rapid object detection using a boosted cascade of simple features. In Proceedings of the IEEE Computer Society Conference on Computer Vision and Pattern Recognition, volume 1, pages 511-518. IEEE, 2001.

[13] G.-Q. Wei and S. D. Ma. Implicit and explicit camera calibration: theory and experiments. IEEE Transactions on Pattern Analysis and Machine Intelligence, 16(5): 469-480, 1994.

[14] Z. Zhang. A flexible new technique for camera calibration. In IEEE Transactions on Pattern Analysis and Machine Intelligence, page 22, 2000.

The invention claimed is:

1. A method for detecting a known pattern comprising homogenous areas, the method comprising:
   taking an image of at least a portion of the known pattern;
   initially detecting a first region of the image, the first region comprising at least two homogenous areas, to estimate at least one region parameter for the first region;
   detecting a feature of the known pattern within a second region of the image, the second region comprising at least two homogenous areas and being adjacent to the first region, to acquire at least one region parameter of the feature within the second region;
   wherein after the detecting of the feature within the first, second, third or another region camera calibration parameters describing the behavior of the camera are updated; and wherein the updating is performed based on a simulated region parameter for a feature within the first, second, third or another region and based on a detected region parameter of the respective feature, and wherein the simulated region parameter is simulated based on the known pattern and previous or estimated camera calibration parameters, and wherein the update is performed such that the updated camera calibration parameters in combination with the known pattern lead to a simulated region parameter which substantially complies with the detected region parameter; or
   wherein after the detecting of the feature within the first, second, third or another region camera calibration parameters describing the behavior of the camera are updated, and wherein the method comprises selecting the second, third or another region within the image, wherein the selection is made based on the updated camera calibration parameters.

2. A computer-implemented method for detecting a known pattern comprising homogenous areas, the method comprising:

taking an image of at least a portion of the known pattern;
initially detecting a first region of the image, the first region comprising at least two homogenous areas, to estimate at least one region parameter for the first region;
detecting a feature of the known pattern within a second region of the image, the second region comprising at least two homogenous areas and being adjacent to the first region, to acquire at least one region parameter of the feature within the second region;
wherein said detection of the feature is iterated for a third region of the image, the third region comprising at least two homogenous areas and being adjacent to the first and/or the second region to acquire at least one region parameter for the feature within the third region;
wherein said detection of a feature of the known pattern is iterated for another region in a direction extending from the first region and going through the second region and/or third region taking into account a an adapted projection model until no additional feature is found in this direction; or
wherein the determining of the feature within the first, second, third or another region comprises a corner detection; and wherein the corner detection comprises morphing the template in accordance to a morphing parameter to acquire a morphing model for the first, second, third or another region; and wherein the method further comprises said determining of a projection model based on the one or more determined region parameters and on the assumption that each vertex of the respective morphable model of the first, second, third or another region is projected into the image and/or distorted.

3. The method according to claim 1, wherein the method further comprises detecting the feature within the first region to verify and/or adapt the at least one region parameter for the first region.

4. The method according to claim 1, wherein said detection of the feature is iterated for a third region of the image, the third region comprising at least two homogenous areas and being adjacent to the first and/or the second region to acquire at least one region parameter for the feature within the third region.

5. The method according to claim 4, wherein said detection of a feature of the known pattern is iterated for another region until no additional feature is found; or
wherein said detection of a feature of the known pattern is iterated for another region in a direction extending from the first region and going through the second region and/or third region until no additional feature is found in this direction.

6. The method according to claim 1, wherein the at least one region parameter comprises a position of the feature to be detected, a position of the first, second, third or another region, a distortion of the known pattern and/or an orientation of the known pattern.

7. The method according to claim 1, wherein the known pattern is a planar known pattern and/or exhibits two homogeneous intensities; and/or
wherein the known pattern is a chess board.

8. The method according to claim 1, wherein the determining of the feature within the first, second, third or another region comprises a corner detection.

9. The method according to claim 8, wherein the corner detection is performed using a morphed template, each being checkerboard model in a 2×2 format comprising 2×2 of homogenous areas, where a comparison between one morphed template and the first, second, third or another region is performed while morphing the template to determine or verify the at least one region parameter.

10. The method according to claim 9, wherein the comparison is performed by determining a correspondence between a portion within the first, second, third or another region of the image and the one or more templates.

11. The method according to claim 10, wherein the correspondence is detected when an intensity difference between mean pixel values of two fields of the checkerboard model exhibits a maximum and/or when a standard deviation of two fields of the checkerboard model exhibits a minimum.

12. The method according to claim 11, wherein the mean pixel values are approximated using the following formula:

$$\hat{\mu}: \mathbb{R}^{M \times 2} \times \mathbb{R}^{w \times h} \to \mathbb{R}$$
$$(M', I_\Sigma) \mapsto \mu_r := \frac{s_r}{a_r};$$

wherein the standard deviation is approximated using the following formula:

$$\hat{\sigma}: \mathbb{R}^{M \times 2} \times \mathbb{R}^{w \times h} \times \mathbb{R}^{w \times h} \to \mathbb{R}$$
$$(M', I_\Sigma, [I^2]_\Sigma) \mapsto \sigma_r := \sqrt{\frac{\hat{s}(M', [I^2]_\Sigma)}{a_r} - \mu_r^2};$$

wherein $a^r$ is defined by $$\hat{a}: \mathbb{R}^{M \times 2} \to \mathbb{R}$$
$$M' \mapsto a_r := \frac{1}{2} \sum_{i=k_r}^{l_r} (\check{u}_i \check{v}_{i+1} - \check{u}_{i+1} \check{v}_i);$$

and
wherein $l_s$ is defined by $$I_\Sigma(x, y) := \sum_{i \le x, j \le y} I(i, j);$$

wherein $s_r$ is a sum of pixel values and wherein $[I^2]_\Sigma$ is an integral image
where each pixel value is squared before the summation.

13. The method according to claim 10, wherein detecting the correspondence comprises minimizing e with respect to morph parameters based on the formula:

$$p^* = \underset{p}{\operatorname{argmin}} \|e\|_2,$$

wherein p is initialized with and wherein e is defined by:

$$e := (e_{12}, e_{21}, e_{23}, e_{32}, e_{34}, e_{43}, e_{41}, e_{14})^T$$
$$\hat{e}: [1, 4] \times [1, 4] \to \mathbb{R}$$
$$(r_a, r_b) \mapsto e_{r_a r_b} := \frac{\sigma_{r_a}}{\mu_{r_a} - \mu_{r_b}}.$$

14. The method according to claim 8, wherein the corner detection comprises morphing the template in accordance to a morphing parameter to acquire a morphing model for the first, second, third or another region.

15. The method according to claim 14, wherein the morph templates are defined by the formula:

$$T_k := \begin{bmatrix} x_{k1} & y_{k1} \\ \vdots & \vdots \\ x_{kM} & y_{kM} \end{bmatrix}, \text{ with } k \in [0, N],$$

wherein the morphing is performed using a morph parameter vector:

$$p := (\Delta_x, \Delta_y, s, \alpha_1, \ldots, \alpha_N)$$

wherein the parameter $\alpha_k$ is associated with each deformation target $T_k$ for k>0 to specify the weight of each template in the linear combination and wherein $\Delta_x$ and $\Delta_y$ are global translations and wherein s is a scaling parameter.

16. The method according to claim 14, wherein a morphable model is defined by:

$$m: \mathbb{R}^{N+3} \to \mathbb{R}^{M \times 2}$$

$$p \mapsto M = \begin{bmatrix} \tilde{x}_1 & \tilde{y}_1 \\ \vdots & \vdots \\ \tilde{x}_M & \tilde{y}_M \end{bmatrix} := s\left(T_0 + \sum_{k=1}^{N} \alpha_k (T_k - T_0)\right) + \begin{bmatrix} \Delta_x & \Delta_y \\ \vdots & \vdots \\ \Delta_x & \Delta_y \end{bmatrix}.$$

17. The method according to claim 16, wherein the method further comprises determining a projection model based on the one or more determined region parameters and on the assumption that each vertex of the respective morphable model of the first, second, third or another region is projected into the image and/or distorted.

18. The method according to claim 17, wherein for determining the projection model a homography matrix is used, the homography matrix defines a linear projection of each vertex $(\tilde{x}, \tilde{y})$ from M into the image frame by:

$$\begin{bmatrix} \tilde{u} \\ \tilde{v} \\ \tilde{w} \end{bmatrix} = H \begin{bmatrix} \tilde{x} \\ \tilde{y} \\ 1 \end{bmatrix},$$

wherein $$u = \tilde{u}/\tilde{w} \text{ and } v = \tilde{v}/\tilde{w},$$

wherein $$\check{u} := u(1 + k_1 r^2 + k_2 r^4) + (p_2(r^2 + 2u) + 2p_1 uv),$$

$$= \check{v}(1 + k_1 r^2 + k_2 r^4) + (p_1(r^2 + 2v) + 2p_2 uv),$$

where the coefficients $k_1$, $k_2$ cause radial distortion and $p_1$, $p_2$ cause tangential distortion, and where the radius r is the distance of each vertex to the distortion center $(c_x, c_y)$.

19. The method according to claim 1, wherein the first region comprises a 3×3 pattern of homogenous areas.

20. The method according to claim 1, wherein the initially detecting comprises calculating the discriminant criterion for a limited number pixel per area, wherein the number of pixel is less than all pixel of the area, wherein the calculation of the discriminant criterion is performed for different regions and/or different distributions of the pixel, wherein the first region is initially detected when the discriminant criterion is fulfilled or exhibits a maximum.

21. The method according to claim 1, wherein the initially detecting is performed by determining a discriminant criterion based on the relationship:

$$s_p := \frac{\hat{\mu}_1 - \hat{\mu}_2}{\hat{\sigma}_1 + \hat{\sigma}_2},$$

wherein $\hat{\sigma}_1$ and $\hat{\sigma}_2$ denote the standard deviation, and wherein $\hat{\mu}_1$ and $\hat{\mu}_2$ denote the corresponding intensity mean values, and where p denotes the dependency on the region parameters; and/or wherein the discriminant criterion is calculated for different combinations of the region parameters to find a proper guess for the region parameters belonging to the portion.

22. A method for calibrating a camera, the method comprises the method for detecting a known pattern comprising homogenous areas according to claim 1; and calculating camera calibration parameters describing the behavior of the camera based on the at least one region parameter for the first region and/or on the at least one region parameter of the feature within the second region.

23. A non-transitory digital storage medium having a computer program stored thereon to perform the method for detecting a known pattern comprising homogenous areas, said method comprising:

taking an image of at least a portion of the known pattern;

initially detecting a first region of the image, the first region comprising at least two homogenous areas, to estimate at least one region parameter for the first region;

detecting a feature of the known pattern within a second region of the image, the second region comprising at least two homogenous areas and being adjacent to the first region, to acquire at least one region parameter of the feature within the second region, when said computer program is run by a computer;

wherein after the detecting of the feature within the first, second, third or another region camera calibration parameters describing the behavior of the camera are updated; and wherein the updating is performed based on a simulated region parameter for a feature within the first, second, third or another region and based on a detected region parameter of the respective feature, and wherein the simulated region parameter is simulated based on the known pattern and previous or estimated camera calibration parameters, and wherein the update is performed such that the updated camera calibration parameters in combination with the known pattern lead to a simulated region parameter which substantially complies with the detected region parameter; or wherein after the detecting of the feature within the first, second, third or another region camera calibration parameters describing the behavior of the camera are updated, and wherein the method comprises selecting the second, third or another region within the image, wherein the selection is made based on the updated camera calibration parameters.

24. An apparatus for detecting a known pattern having homogenous areas, the apparatus comprising:
- an input interface for receiving an image of the known pattern;
- a calculation unit configured for initially detecting a first region of the image, the first region comprising at least two homogenous areas, to estimate at least one region parameter for the first region; and
- wherein the calculation unit is configured for detecting a feature of the known pattern within a second region of the image, the second region comprising at least two homogenous areas and being adjacent to the first region, to acquire at least one region parameter of the feature within the second region;
- wherein after the detecting of the feature within the first, second, third or another region camera calibration parameters describing the behavior of the camera are updated; and wherein the updating is performed based on a simulated region parameter for a feature within the first, second, third or another region and based on a detected region parameter of the respective feature, and wherein the simulated region parameter is simulated based on the known pattern and previous or estimated camera calibration parameters, and wherein the update is performed such that the updated camera calibration parameters in combination with the known pattern lead to a simulated region parameter which substantially complies with the detected region parameter; or
- wherein after the detecting of the feature within the first, second, third or another region camera calibration parameters describing the behavior of the camera are updated, and wherein the method comprises selecting the second, third or another region within the image, wherein the selection is made based on the updated camera calibration parameters.

25. A non-transitory digital storage medium having a computer program stored thereon to perform the method for detecting a known pattern comprising homogenous areas, said method comprising:
- taking an image of at least a portion of the known pattern;
- initially detecting a first region of the image, the first region comprising at least two homogenous areas, to estimate at least one region parameter for the first region;
- detecting a feature of the known pattern within a second region of the image, the second region comprising at least two homogenous areas and being adjacent to the first region, to acquire at least one region parameter of the feature within the second region,
- when said computer program is run by a computer,
- wherein said detection of the feature is iterated for a third region of the image, the third region comprising at least two homogenous areas and being adjacent to the first and/or the second region to acquire at least one region parameter for the feature within the third region;
- wherein said detection of a feature of the known pattern is iterated for another region in a direction extending from the first region and going through the second region and/or third region taking into account a an adapted projection model until no additional feature is found in this direction; or
- wherein the determining of the feature within the first, second, third or another region comprises a corner detection; and wherein the corner detection comprises morphing the template in accordance to a morphing parameter to acquire a morphing model for the first, second, third or another region; and wherein the method further comprises said determining of a projection model based on the one or more determined region parameters and on the assumption that each vertex of the respective morphable model of the first, second, third or another region is projected into the image and/or distorted.

26. An apparatus for detecting a known pattern having homogenous areas, the apparatus comprising:
- an input interface for receiving an image of the known pattern;
- a calculation unit configured for initially detecting a first region of the image, the first region comprising at least two homogenous areas, to estimate at least one region parameter for the first region; and
- wherein the calculation unit is configured for detecting a feature of the known pattern within a second region of the image, the second region comprising at least two homogenous areas and being adjacent to the first region, to acquire at least one region parameter of the feature within the second region,
- wherein said detection of the feature is iterated for a third region of the image, the third region comprising at least two homogenous areas and being adjacent to the first and/or the second region to acquire at least one region parameter for the feature within the third region;
- wherein said detection of a feature of the known pattern is iterated for another region in a direction extending from the first region and going through the second region and/or third region taking into account a an adapted projection model until no additional feature is found in this direction; or
- wherein the determining of the feature within the first, second, third or another region comprises a corner detection; and wherein the corner detection comprises morphing the template in accordance to a morphing parameter to acquire a morphing model for the first, second, third or another region; and wherein the method further comprises said determining of a projection model based on the one or more determined region parameters and on the assumption that each vertex of the respective morphable model of the first, second, third or another region is projected into the image and/or distorted.

* * * * *